Jan. 2, 1934.  A. BIZZARRI  1,942,272
LIFT HAND TRUCK
Original Filed Feb. 10, 1931
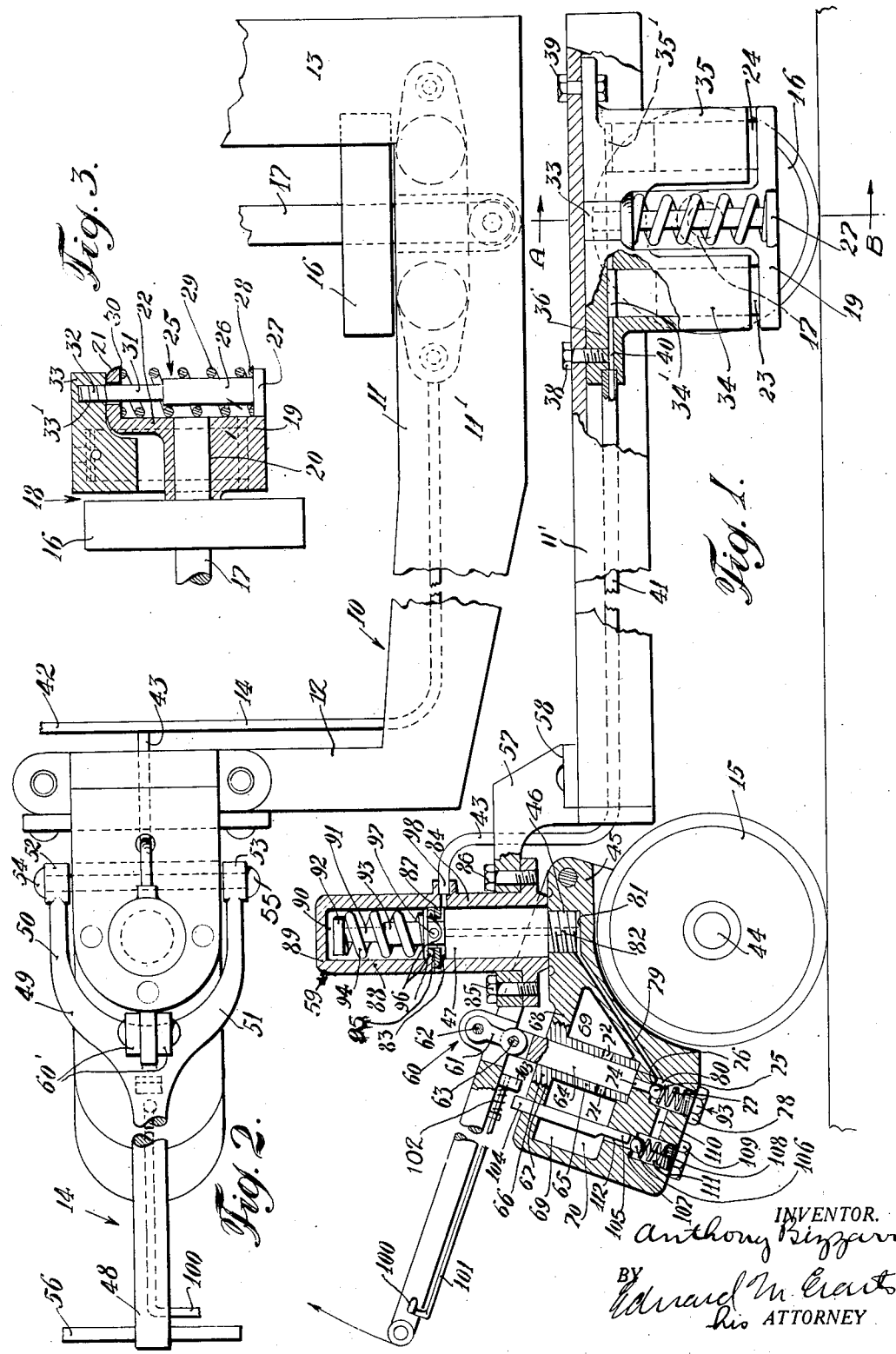
INVENTOR.
Anthony Bizzarri
BY Edward M. Evarts
his ATTORNEY Patented Jan. 2, 1934

1,942,272

UNITED STATES PATENT OFFICE 1,942,272

LIFT-HAND TRUCK

Anthony Bizzarri, New York, N. Y.

Application February 10, 1931, Serial No. 514,783
Renewed May 22, 1933

5 Claims. (Cl. 138—9)

My present invention relates to hydraulic lift trucks and the like, and aims to devise devices of the general character specified which are simple in construction, which may be readily and economically fabricated and assembled, and which are highly efficient in operation, the operation of the devices of the present invention being characterized by their convenience and efficiency, permitting the hydraulic lift trucks of the present invention to be used with the utmost convenience and speed for the purposes for which such devices are intended to be employed. Other objects and advantages of the devices of the present invention, particularly as exemplified in the following illustrative embodiment of the same, will in part be obvious to those skilled in the art to which the present invention relates.

In the accompanying specification I shall describe and in the annexed drawing more or less diagrammatically exemplify an illustrative embodiment of the devices of the present invention. It is, however, to be clearly understood that my invention is not limited to the specific embodiment thereof herein shown and described for purposes of illustration only.

Referring to the drawing illustrating the aforesaid illustrative embodiment of the present invention:

Fig. 1 is a side elevation, shown partly broken away to make the showing clearer, of the aforesaid illustrative embodiment of the present invention;

Fig. 2 is a fragmentary detail plan view on an enlarged scale of a portion of the embodiment of the drawing illustrated in Fig. 1 of the drawing; and Fig. 3 is a detailed sectional view, partly in elevation, taken along line A—B of Fig. 1 of the drawing.

Referring now to the aforesaid illustrative embodiment of the present invention, and with particular reference to the various figures of the drawing illustrating the same, 10 indicates a truck frame comprising the two side portions 11, the forward portion 12 and the rear portion 13. This truck frame may be of any desired construction and may be made of any desired material in accordance with the practice prevailing in the art to which the present invention relates.

The truck, which has generally been designated by reference character 14, is supported by three wheels, as the forward wheel 15 and the rear wheels 16. Since the two rear wheels 16 are similarly arranged and supported, it will be sufficient for the purposes of the present invention to describe but one only of the wheels in detail. The two rear wheels 16 are carried by an axle 17. The axle 17 at each end thereof passes through the depending flange portion 18 of the truck frame 10. On the outer side of the depending portion 17, the wheel 16 being on the inner side of such depending portion, the axle carries a platform 19 which has a bearing sleeve or portion 20 surrounding the portion of the axle and has also the upper forwardly extending flange portion 21 for a purpose shortly to be described. The flange portion 21 forms an extension of the central bracket or supporting member 22.

Carried by the platform 19 are one or more, here shown as two, elements of one or more, here shown as two, hydraulic cylinder-piston combinations. In the form shown in the drawing and described in the specification by way of example merely, the element or elements of the hydraulic cylinder-piston combination or combinations here shown are the pistons 23 and 24, preferably shown as a pair of balanced or substantially symmetrical cylinders 22, 23 and 24 which are secured to, as by being made integral, with, the platform 19 which carries or supports the same. I prefer that the elements 23 and 24, shall be symmetrically placed with respect to the center of the axle 17 and with respect to the center of the pin 25 which is of enlarged diameter adjacent its lower end 26 and is provided with the flange portion 27 against the upper surface of which bears the lower end 28 of a coil or other compression spring 29, the upper end 30 of which bears against the lower surface of the flange portion 21. Adjacent its upper end 31, the pin 25 is of reduced diameter and has its upper end 32 threaded for being secured into the portion 33 which contains or embodies the other element or elements of the hydraulic cylinder combination or combinations which are secured to the truck frame 10 as distinguished from the axle and wheel constructions just described. Cooperating with the elements 23 and 24, here the pistons, of the hydraulic cylinder-piston combinations referred to are a plurality of cooperating elements 34 and 35, here shown as hydraulic cylinders constituting the remaining elements of the two pairs of hydraulic cylinder-piston elements already referred to. Preferably the cylinder elements 34 and 35 may be cast in a single piece together with the part 33 already described and which has the internally threaded cavity 33' for cooperation with the externally threaded end 33 of the spring pin 25 already described.

The cylinders 34 and 35 are provided with the supporting flange member 36 which is secured to the upper flange portion 11' of the side member 11 of the truck frame 10, as by the threaded belts 38 and 39. It may here be stated that just as the axle 17 and the associated wheel 16 are located adjacent the corners of the truck frame 10, so the corresponding cooperating cylinder elements 34 and 35 and the frame 36 which carries the same are located adjacent the same corners of the truck frame 10 so that such hydraulic cylinder elements 34 and 35 will fit snugly but slidably over the corresponding cooperating hydraulic piston elements 23 and 24 carried by the platform 19.

34' and 35' indicate spaces for hydraulic fluid within the hydraulic cylinder elements 34 and 35 above the corresponding hydraulic piston elements 23 and 24 when the parts are in the assembled relation shown in Fig. 1 of the drawing. 40 is a substantially continuous port in the supporting portion 36 for the hydraulic cylindrical elements 34 and 35 communicating with the spaces 34' and 35' so that such spaces are always in communication with each other and with the port 40. 41 is a branch pipe line and 42 is the remaining branch pipe line communicating with a main pipe line 43 for receiving hydraulic fluid under pressure in a manner which will be described in considerable detail later in this specification. It may here be stated that the branch pipe lines 41 and 42 go to the opposite sides 11 of the truck frame 10 for supplying the two different sides of pairs of hydraulic cylinder-piston combinations corresponding to the two wheels 16 at the opposite ends of the axle 17 in the manner already indicated above. It may here be repeated that the arrangement of each side of pairs of hydraulic cylinder-piston combinations are the same at each rear corner of the truck on each side of the truck and that therefore the truck frame with regard to these two sides of pairs of hydraulic cylinder-piston combinations is the same so that the truck will at all times be in balance on both sides in a manner which will be described in greater detail later in the specification.

The front wheel 15 is carried by a front axle 44 which in turn is carried by a freely pivotal table or platform 45. The table 45 is of a whole construction for the purposes which will shortly be described in considerable detail herein and carries, as by having threaded into the same in the threaded hole 46, one element, such as a piston 47, of a hydraulic cylinder-piston combination having the construction which will now be described in considerable detail. Pivoted to the table 45, as by the pin 48 passing through the rear end of the table, is the operating handle 48 which has the forked inner end 49 embodying the fork arms 50 and 51 which at their inner ends have the sleeves 52 and 53 carried by the outer ends 54 and 55 of the pin or pivot 48 passing through the rear end of the table 45 and about which the handle 48 may be pivotally operated. 56 provides hand grasps for moving the truck for facilitating the manipulation of the handle 48. It may here be stated that the forked end 49 of the handle 48 straddles the platform 57 secured by the means 58 to the forward end 12 of the truck member 10, which platform 57 carries the remaining element, in this case the hydraulic cylindrical element of the hydraulic cylinder-piston combination generally designated by reference character 59 which is carried by the forward end of the truck.

Adjacent its ends, as at the point 60, the handle 48 carries a link 61, one end of which is hinged, as at 62, to the portion 60 of the handle 48 which portion 60 preferably comprises two spaced members 60' fixedly attached to the handle 48 at the portion 60 and carrying between them the link 61. At its lower end the link 61 is pivoted, as at 63, to a hydraulic piston 64 which is adapted to reciprocate within the hydraulic cylinder 65 formed within the recesses of the table or platform 45 so that by the operation of the handle 48 up and down the piston 64 will be reciprocated up and down within the cylinder 65 to pump hydraulic fluid in a manner which will now be described in considerable detail.

The cylinder 65 may have the threaded head 66 which is threaded into a threaded opening 67 in the upper wall 68 forming a part of the table or platform 45. Within the table or platform 45 is a chamber 69 constituting a reservoir for hydraulic fluid 70, such as lubricating oil or other suitable fluid which will not rust or otherwise damage the operative portions of the device. The cylinder 65 is provided with a plurality of ports 71 and 72 which communicate with the fluid reservoir 69 and with its extension 69' on the other side of the hydraulic cylinder 65. Conventional check valves (not shown) are used to control the delivery of hydraulic fluid from the reservoir 69 throughout the ports 71 and 72 thence into the space within the cylinder 65 below the piston 64 by way of the port 74.

Discharge of hydraulic fluid from the port 74 is controlled by the ball valve 75 which sits against the valve seat 76 formed in the internal structure of the portion of the table or platform 45 now being described. The ball valve 75 is normally kept in contact with the seat 76 by means of the compression spring 77 which by reason of the expansive force inherent in it normally maintains the ball valve 75 in place against the seat 76. 78 is a screw cap by the manipulation of which the pressure exerted by the compression spring 77 against the ball valve 75 to maintain the same against the seat 76 may be regulated and controlled as desired.

79 is a port from the space 80 surrounding the ball valve 75 and the spring 77 and communicating in turn with the space 81 in the threaded cavity 46 which contains the piston 47, the piston itself having a port 82 passing through the same.

The port 82 passing through the piston 47 communicates with the space 83 above the piston 47 within the cylinder 84. The cylinder 84 is also described as rigidly connected to the platform 57, as by means of the threaded bolts 85 and 86. The cylinder 84 has the thrust bearing 87 and has the spring containing sleeve or extension 88 having the head 89. Suitably positioned in the lining 90 is the springed stem 91 having the inner flange portion 92. The stem 91 extends into a sleeve 93. Surrounding the stem 91 and the sleeve 93 is a coil or other compression spring 94 the upper end of which bears against the flange portion 92 of the stem 91 and the lower end of which bears against the thrust bearing 95 which is secured to the sleeve 93. 96 are steel balls and 97 is an outlet hole communicating with port 82 on piston 47 for the outlet of hydraulic fluid to cylinder head or port (83). The port 83 communicates with the port 98 which leads to the pipe 43 already described.

This completes the description of the aforesaid illustrative embodiment of the present invention. The structure and mode of assembly of the embodiment will, it is submitted, clearly appear from the foregoing description. Likewise the mode of operation of such embodiment will, it is submitted, clearly appear from the foregoing description but may be briefly summarized as follows: Assuming that the parts of the device are in the positions indicated in full lines in Figs. 1, 2 and 3 of the drawing, the truck frame 10 will be in its lowermost position, the springs 29 serving to support the truck frame 10 in a more or less resilient condition on the axles 17 and 44 carrying the wheels 16 and 15, respectively.

Assuming now that it is desired to raise the truck frame 10 into loading or other position, the operator manipulates the handle 48 up and down. This causes the reciprocation of the hydraulic piston 64 in the hydraulic cylinder 65. This action forces hydraulic fluid 70 from the reservoirs 69 and 69' through the ports 71 and 72 in the hydraulic cylinder 65 into the space beneath the piston 64 through the port 74 past the space between the ball valve 75 and the seat 76 into the space 80 surrounding the ball valve 75 and the spring 77 and thence into the port 79. From the port 79 hydraulic fluid under pressure passes into the space 81 thence through the port 82 in the piston 47. From the port 82 in the piston 47 the fluid passes into the space 83 above the cylinder 47 thence into the port 98 into the main pipe line 43. Here the hydraulic fluid already filling the space 83 divides itself into the two branches 41 and 42 passing thence through the ports 40 to the spaces 34' and 35' above the pistons 23 and 24 in the respective cylinders 34 and 35. This action continues to elevate the truck frame 10 as long as the pressure of the hydraulic fluid continues to be increased until shoulder 25 touches shoulder 21 near cylinders and space between sleeve 93 and head 91 of front piston is closed.

Should it now be desired to lower the truck frame 10, the following mechanism is employed in the manner now to be described: I provide a manipulating member 100 which serves to actuate the stem 101 against the action of a spring 102 surrounding the stem, which stem 101 carries at its inner end the projection 103. By this manipulation of the stem 101 carrying the projection 103 such projection 103 may be brought into alignment with the valve pin 104 adapted to reciprocate in a suitable portion of the table or platform 45 within the reservoir chamber 49. At its lower end the valve pin 104 has the projection 105, preferably of reduced diameter and which may be brought to bear against the pressure releasing ball valve 106 which seats against the valve seat 107. The ball valve 106 is normally maintained against the seat 107 by means of the coil or other compression spring 108 by reason of the expansive force inherent in such spring 108. 109 is a threaded cap which is threaded into a suitable portion of the table or platform 45 and which may therefore regulate the force of the spring 108. 110 is a port communicating with the port 79 by way of the space 80 surrounding the ball valve 75 and the spring 77 and thus with the space 111 surrounding the ball valve 106 and the spring 108 and thus by way of the port 112 with the interior of the hydraulic fluid chamber 69. It will therefore be seen that by the manipulation of the stem 101 by means of the operating member 100 the projection 103 having been brought into alignment with the valve pin 104 and the handle 48 having been manipulated in a downward direction will "crack" the release valve 106 by depressing it below its seat 107 against the action of the spring 108, thus permitting hydraulic fluid under pressure from the spaces 34' and 35' on each side of the truck frame by way of the port 40 and also permitting hydraulic fluid from the space 83 by way of the port 82 to pass through the port 79 into the space 80 through the port 110 through the space 111 past the space between the ball valve 106 and the seat 107 through the port 112 back into the hydraulic fluid reservoir 69, thus permitting the parts to resume their normal lower position. This discharge of the hydraulic fluid from the spaces and ports just enumerated is facilitated by the action of the spring 94.

This completes the description of the mode of operation of the aforesaid illustrative embodiment of the present invention. It will be noted that such operation is simple and efficient and expeditious and accomplishes the desired purpose in an ideal manner.

Other superiorities and advantages of the devices of the present invention in mode of construction, mode of operation and use will readly occur to those skilled in the art to which the present invention relates.

What I claim as my invention is:

1. In a device of the character described, front and rear platforms provided with axles and wheels, hydraulic pistons carried by said front and rear platforms, hydraulic cylinders cooperating with said hydraulic pistons, the hydraulic cylinder on the front platform enclosing a spring for retaining said cylinder in normal position, the rear platform carrying a spring for retaining said platform in normal position, a truck body supported by said hydraulic cylinders, and hydraulic pumping means, operable by the truck handle cooperating with said hydraulic pistons and said hydraulic cylinders for raising said truck body.

2. In a device of the character described, front and rear platforms provided with axles and wheels, hydraulic pistons carried by said front and rear platforms, hydraulic cylinders cooperating with said hydraulic pistons, the hydraulic cylinder on the front platform enclosing a spring for retaining said cylinder in normal position, the rear platform carrying a spring for retaining said platform in normal position, a truck body supported by said hydraulic cylinders, means operable by the truck handle cooperating with said hydraulic pistons and said hydraulic cylinders for raising said truck body, and means, operable by the truck handle associated with said first-named means for lowering said truck body.

3. In a device of the character described, front and rear platforms provided with axles and wheels, hydraulic pistons carried by said front and rear platforms, hydraulic cylinders cooperating with said hydraulic pistons, the hydraulic cylinder on the front platform enclosing a spring for retaining said cylinder in normal position, the rear platform carrying a spring for retaining said platform in normal position, a truck body supported by said hydraulic cylinders, hydraulic pumping means, operable by the truck handle cooperating with said hydraulic pistons and said hydraulic cylinders for raising said truck body, and means, operable by the truck handle, associated with said hydraulic pumping means for lowering said truck body.

4. In a device of the character described, front and rear platforms provided with axles and wheels, hydraulic pistons carried by said front and rear platforms, hydraulic cylinders cooperating with said hydraulic pistons, the hydraulic cylinder on the front platform enclosing a spring for retaining said cylinder in normal position, the rear platform carrying a spring for retaining said platform in normal position, a truck body supported by said hydraulic cylinders, means, operable by the truck handle, cooperating with said hydraulic pistons and said hydraulic cylinders for raising said truck body, and a pin-actuated valve, operable by the truck handle, associated with said means for lowering said truck body.

5. In a device of the character described, front and rear platforms provided with axles and wheels, hydraulic pistons carried by said front and rear platforms, hydraulic cylinders cooperating with said hydraulic pistons, the hydraulic cylinder on the front platform enclosing a spring for retaining said cylinder in normal position, the rear platform carrying a spring for retaining said platform in normal position, a truck body supported by said hydraulic cylinders, hydraulic pumping means, operable by the truck handle, cooperating with said hydraulic pistons and said hydraulic cylinders for raising said truck body, and a pin-actuated valve, operable by the truck handle, associated with said hydraulic pumping means for lowering said truck body.

ANTHONY BIZZARRI.